(12) United States Patent
Schermerhorn

(10) Patent No.: US 10,225,971 B1
(45) Date of Patent: Mar. 12, 2019

(54) BEACH UMBRELLA HOLE DIGGING DEVICE

(71) Applicant: William R. Schermerhorn, Colfax, NC (US)

(72) Inventor: William R. Schermerhorn, Colfax, NC (US)

( * ) Notice: Subject to any disclaimer, the term of this patent is extended or adjusted under 35 U.S.C. 154(b) by 0 days.

(21) Appl. No.: 15/723,356

(22) Filed: Oct. 3, 2017

(51) Int. Cl.
*A01B 1/00* (2006.01)

(52) U.S. Cl.
CPC ...................... *A01B 1/00* (2013.01)

(58) Field of Classification Search
CPC ... E04H 15/60; A01B 1/00; A01B 1/02; B25J 1/04; E04D 13/0765
See application file for complete search history.

(56) References Cited

U.S. PATENT DOCUMENTS

| | | | | |
|---|---|---|---|---|
| 2009/0111659 A1* | 4/2009 | Xiang | ...................... | A63B 5/11 482/29 |
| 2011/0132420 A1* | 6/2011 | Livacich | ............... | E04H 15/001 135/123 |
| 2011/0303255 A1* | 12/2011 | DeLap | .................... | E04H 15/60 135/114 |
| 2015/0176302 A1* | 6/2015 | Duqum | ................... | E04H 15/60 135/114 |
| 2015/0368905 A1* | 12/2015 | Nichols | ............... | E04D 13/0765 134/8 |

* cited by examiner

*Primary Examiner* — Stephen Vu
(74) *Attorney, Agent, or Firm* — MacCord Mason PLLC

(57) ABSTRACT

A beach umbrella hole digging device including a tubular shaft with a pair of handles and a plunger rod that passes through the shaft and out the top. The handles help push and rotate the device into the sand. Once removed, the plunger rod can push out the sand that was inside the tubular shaft. Regular intervals are marked on the outside of the tubular shaft to show a user how deep the hole is and allow for a precise depth. By creating a hole that is the perfect diameter and depth for an umbrella pole, the user can securely set up his or her umbrella with minimal effort and time required. Furthermore, the construction of the present beach umbrella hole digging device is simple and allows for each of the components to press fit together. The device can look like the body and head of an animal.

2 Claims, 7 Drawing Sheets

BEACH UMBRELLA HOLE DIGGING DEVICE

BACKGROUND OF THE INVENTION

Various types of digging devices are known in the prior art. However, many existing digging devices are labor intensive and unwieldy. When headed to the beach, most people with umbrellas forgo these tools altogether, and instead resort to using their hands or hammering the top of the umbrella pole. Not only are these methods difficult and uncomfortable, but they are also ineffective. A windy day on the beach can quickly turn disastrous as umbrellas with pointed poles go flying towards innocent bystanders. The use of a digging device is imperative to truly secure a beach umbrella, yet few existing devices are intended for small, precise holes. Of those digging devices that are intended for beach umbrellas, many are augers and need to be forcefully rotated into the sand. Furthermore, it is difficult to tell how deep of a hole has been dug, resulting in frustrated users with uncomfortably low umbrellas. What is needed, and what the present beach umbrella hole digging device provides, is a digging device that quickly and easily makes the perfect hole for a beach umbrella. By using a hollow pipe with a plunger instead of an auger, the device is simply pressed into the ground a short distance and then removed to expel a plug of sand. Furthermore, it is marked at regular intervals on the outside in order to allow the user to achieve a precise depth.

FIELD OF THE INVENTION

The present invention relates to digging devices, and more particularly, to a beach umbrella hole digging device.

SUMMARY OF THE INVENTION

The general purpose of the present beach umbrella hole digging device, described subsequently in greater detail, is to provide a digging device that has many novel features that result in a digging device which is not anticipated, rendered obvious, suggested, or even implied by prior art, either alone or in combination thereof.

To accomplish this, the present digging device includes a tubular shaft having an exterior, an interior, a central axis, a length, an outer diameter, and an inner diameter. A plurality of evenly spaced horizontal demarcations is disposed on the exterior of the tubular shaft. Such demarcations allow a user to know exactly how deep a hole is being dug. A tubular T joint has an outer diameter and an inner diameter, and the outer diameter of the tubular T joint is greater than the outer diameter of the tubular shaft. Furthermore, the inner diameter of the tubular T joint is approximately equal to the outer diameter of the tubular shaft, and each of the outer diameter of the tubular shaft and the inner diameter of the tubular T joint is configured such that the tubular T joint can receive the tubular shaft as a press fit.

The device further includes a pair of tubular handles, with each of the pair of tubular handles having a capped end, an open end, a thin section, and a thick section. The thick section terminates with the capped end, and the thin section terminates with the open end. The thick section of each of the pair of tubular handles has an outer diameter that is approximately equal to the outer diameter of the tubular T joint, and the thin section of each of the pair of tubular handles has an outer diameter that is approximately equal to the inner diameter of the T joint. The outer diameter of each of the thick section and the thin section is configured such that the tubular T joint can receive each of the thin sections of each of the pair of tubular handles as a press fit. The hole digging device takes the form of a cross, with a handle fit on each side of the tubular T joint and the tubular shaft extending from the bottom of the tubular T joint. In a preferred embodiment of the invention, the tubular T joint and the pair of tubular handles have a first cover that is shaped like the body and arms of an animal.

The top of the T joint has a tubular top extension having a thin side and a thick side. The thick side of the tubular top extension has an outer diameter that is approximately equal to the outer diameter of the tubular T joint, and the thin side of the tubular top extension has an outer diameter that substantially conforms to the inner diameter of the T joint. The outer diameter of each of the thin side and the thick side is configured such that the tubular T joint can receive the thin side of the tubular top extension as a press fit. In the preferred embodiment of the invention, the tubular top extension has a second cover that is shaped like an animal head.

Inside the tubular shaft and passing through the tubular T joint there is a plunger rod having a length and a diameter. The length of the plunger rod is shorter than the length of the tubular shaft, and the diameter of the plunger rod is less than the inner diameter of the tubular shaft.

Fixed to the plunger rod is a tubular plunger stopper collar having an inner diameter, an outer diameter, and a length. The inner diameter of the plunger stopper collar substantially conforms to the diameter of the plunger rod, the outer diameter of the plunger stopper collar substantially conforms to the inner diameter of the tubular shaft, and the length of the plunger stopper collar is less than the length of the tubular shaft. Each of the inner diameter and the outer diameter is configured such that the plunger stopper collar can receive the plunger rod as a press fit, and the tubular shaft can receive the plunger stopper collar as a slip fit. A plurality of grooves is disposed on the tubular plunger stopper collar. Each of the plurality of grooves is substantially parallel to the central axis of the tubular shaft. The plurality of grooves is slidable throughout the inside of the tubular shaft while disposed to the plunger rod. This allows the plunger rod to slide through the tubular shaft and partially out the top of the tubular top extension, yet prevents the tubular shaft from coming all the way out.

Lastly, the device includes a hollow plunger top having an opening. The opening has a diameter substantially conforming to the outer diameter of the cylindrical rod, which allows it to be fixed onto the cylindrical plunger rod as a press fit.

Thus have been broadly outlined the more important features of the present digging device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
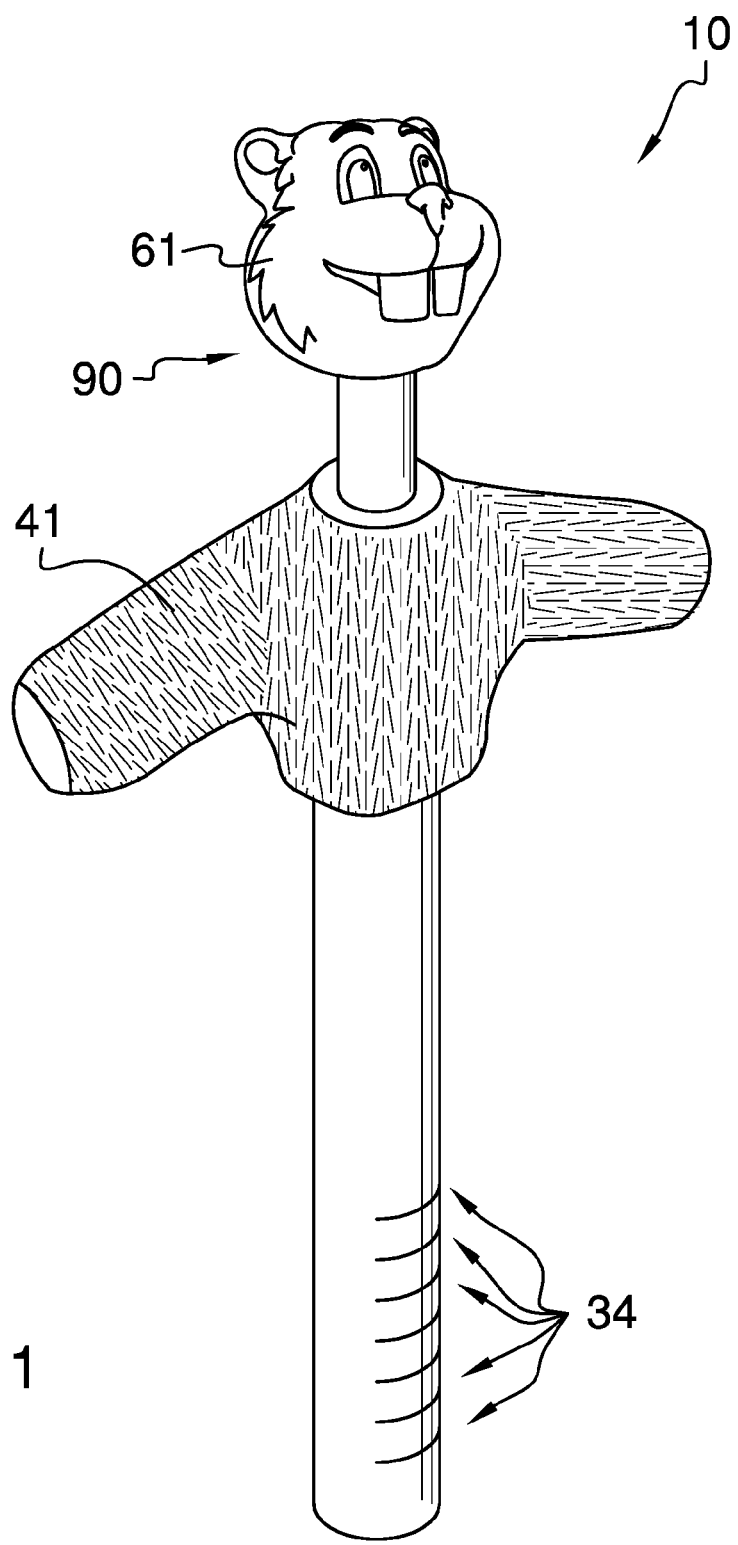
FIG. 1 is an isometric view showing a beach umbrella hole digging device in its entirety.
Figure 2:
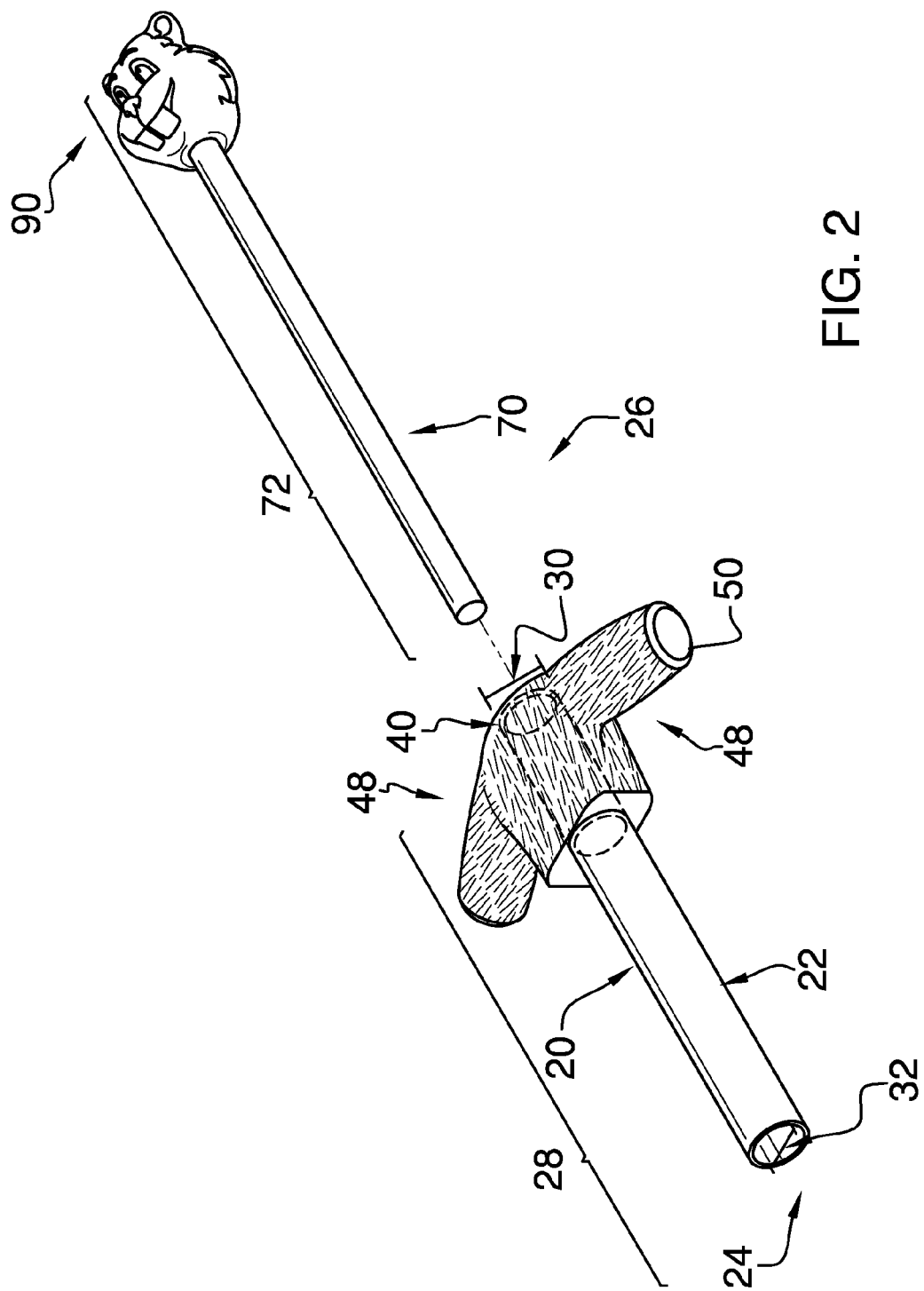
FIG. 2 is an exploded isometric view showing a plurality of components of the beach umbrella hole digging device and highlighting the simplicity of its construction.
Figure 3:
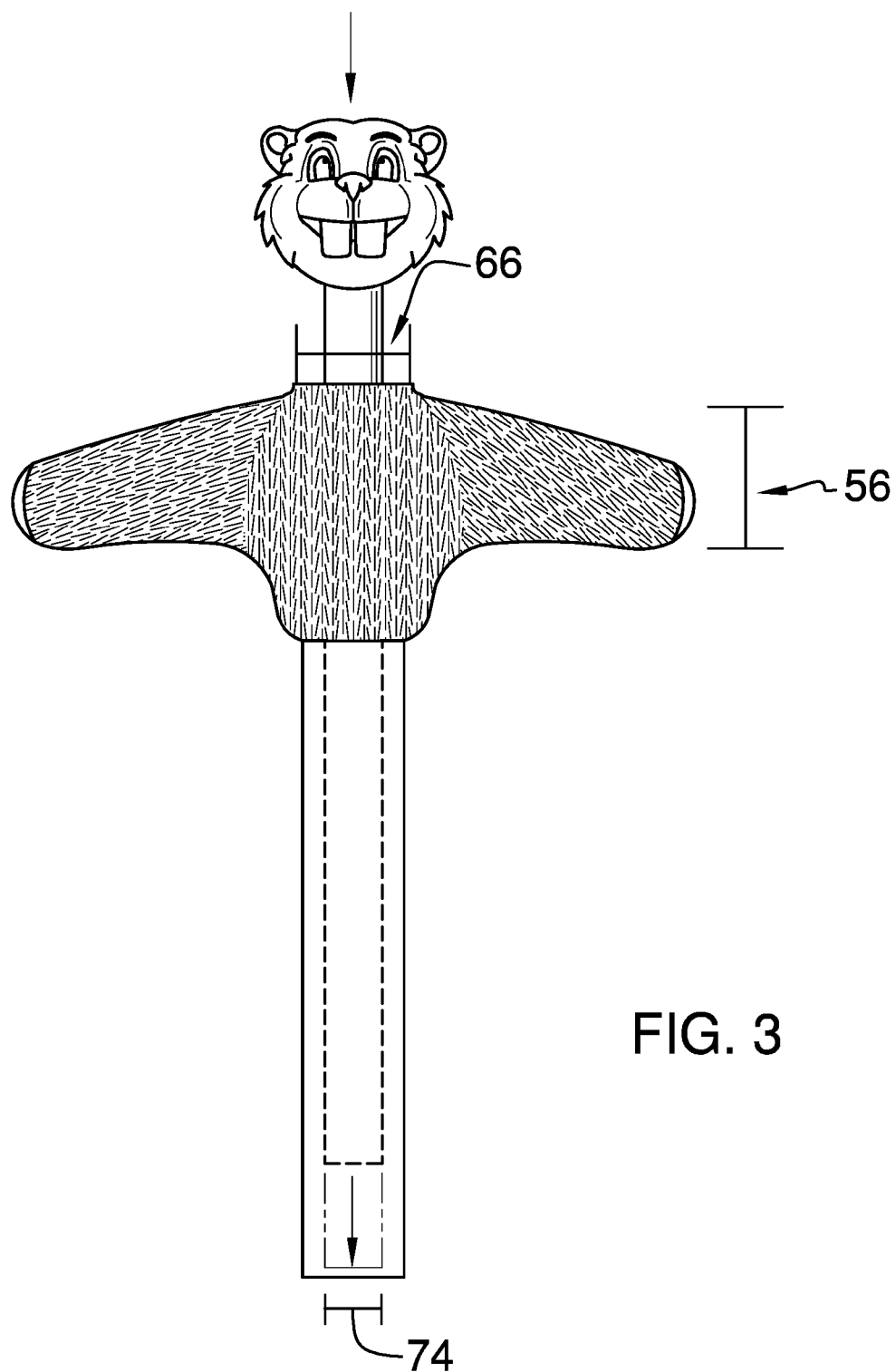
FIG. 3 is a front elevation view showing the components joined together.
Figure 4:
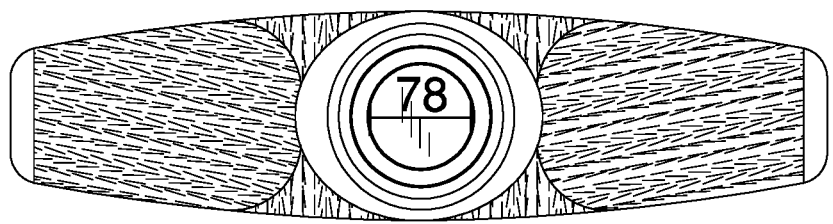
FIG. 4 is a bottom view.
Figure 5:
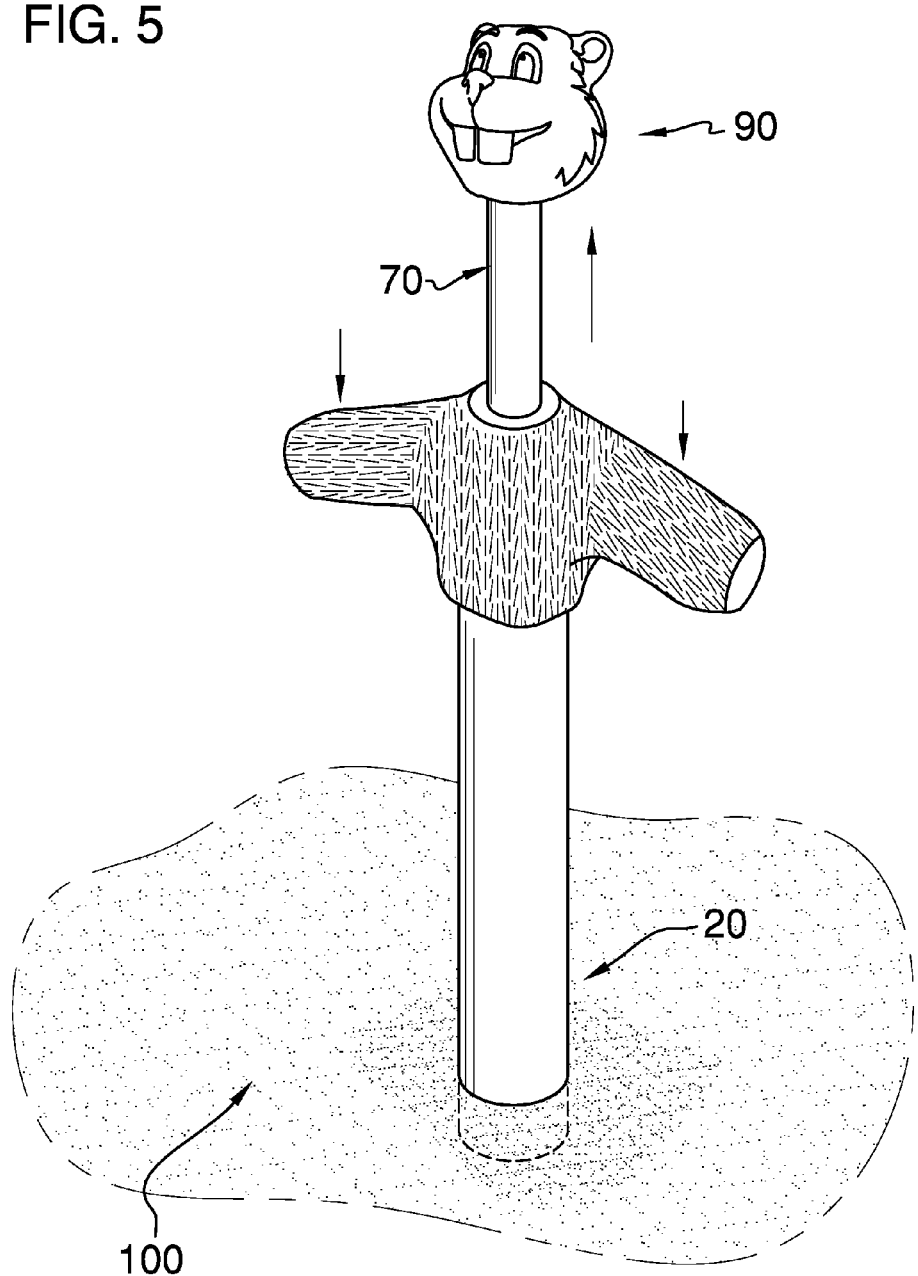
FIG. 5 is an in use isometric view showing the beach umbrella hole digging device inserted into a plot of sand.
Figure 6:
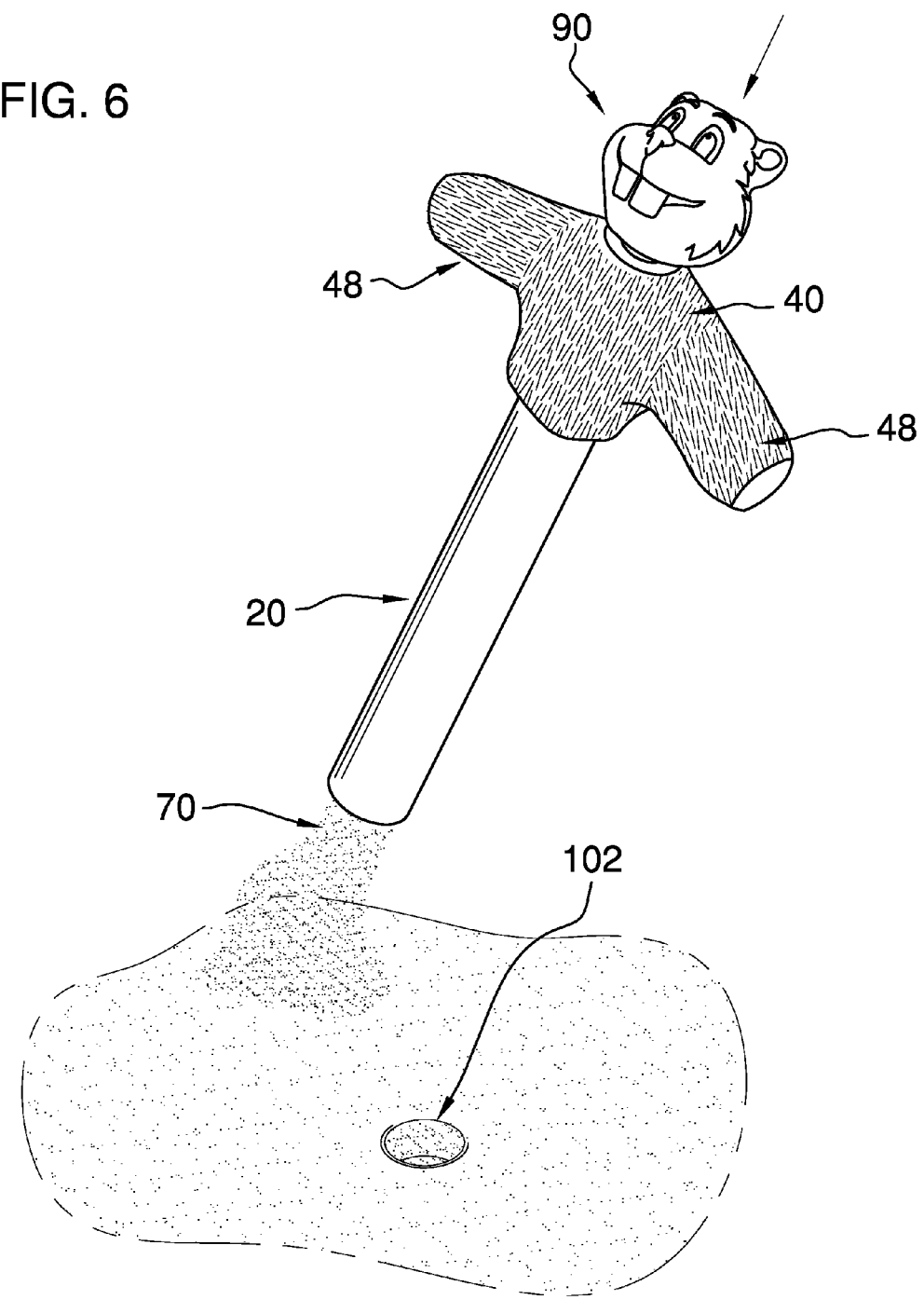
FIG. 6 is an in use isometric view showing the beach umbrella hole digging device removed from the sand and with a plunger rod extended through the bottom of a tubular shaft.
Figure 7:
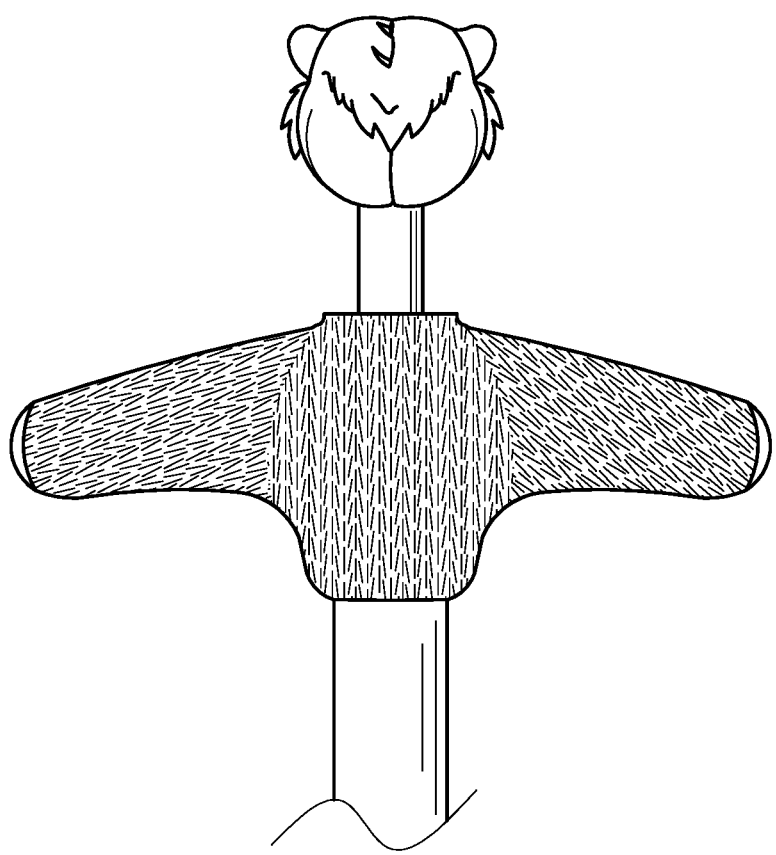
FIG. 7 is a rear view showing the beach umbrella hole digging device.

With reference now to the drawings, and in particular FIGS. 1 through 7 thereof, an example of the present beach umbrella hole digging device employing the principles and concepts of the present beach umbrella hole digging device and generally designated by the reference number 10 will be described.

Referring to FIGS. 1 through 7 the present beach umbrella hole digging device 10 is illustrated. The beach umbrella hole digging device 10 includes a tubular shaft 20 having an exterior 22, an interior 24, a central axis 26, a length 28, an outer diameter 30, and an inner diameter 32. A plurality of evenly spaced horizontal demarcations 34 is disposed on the exterior of the tubular shaft.

A tubular T joint 40 has an outer diameter 42 and an inner diameter 44. The outer diameter of the tubular T joint 42 is greater than the outer diameter of the tubular shaft 30, and the inner diameter of the tubular T joint 44 substantially conforms to the outer diameter of the tubular shaft 30. Each of the outer diameter of the tubular shaft 30 and the inner diameter of the tubular T joint 44 is configured such that the tubular T joint 40 can receive the tubular shaft 20 as a press fit.

A pair of tubular handles 48 has a capped end 50, an open end 52, a thin section 54, and a thick section 55. The thick section 55 terminates with the capped end 50, and the thin section 54 terminates with the open end 52. Furthermore, the thick section of each of the pair of tubular handles 55 has an outer diameter 56 that substantially conforms to the outer diameter of the tubular T joint 42, and the thin section of each of the pair of tubular handles 54 has an outer diameter 57 that substantially conforms to the inner diameter of the T joint 44. The outer diameter of each of the thick section 56 and the thin section 57 is configured such that the tubular T joint 40 can receive each of the thin sections of each of the pair of tubular handles 54 as a press fit. In a preferred embodiment of the invention, the tubular T joint 40 and the pair of tubular handles 48 have a first cover 41 that is shaped like the body and arms of an animal.

A tubular top extension 60 has a thin side 62 and a thick side 64. The thick side of the tubular top extension 64 has an outer diameter 66 that substantially conforms to the outer diameter of the tubular T joint 42, and the thin side of the tubular top extension 62 has an outer diameter 68 that substantially conforms to the inner diameter of the T joint 44. The outer diameter of each of the thin side 68 and the thick side 66 is configured such that the tubular T joint 40 can receive the thin side of the tubular top extension 62 as a press fit. In the preferred embodiment of the invention, the tubular top extension 60 has a second cover 61 that is shaped like an animal head.

A cylindrical plunger rod 70 has a length 72 and a diameter 74. The length of the plunger rod 72 is shorter than the length of the tubular shaft 28, and the diameter of the plunger rod 74 is less than the inner diameter of the tubular shaft 32.

A tubular plunger stopper collar 76 has an inner diameter 78, an outer diameter 80, and a length 82, with the inner diameter of the plunger stopper collar 78 substantially conforming to the diameter of the plunger rod 74, the outer diameter of the plunger stopper collar 80 substantially conforming to the inner diameter of the tubular shaft 32, and the length of the plunger stopper collar 82 less than the length of the tubular shaft 28. Each of the inner diameter 78 and the outer diameter 80 is configured such that the plunger stopper collar 76 can receive the plunger rod 70 as a press fit, and the tubular shaft 20 can receive the plunger stopper collar 76 as a slip fit.

A plurality of grooves 86 is disposed on the tubular plunger stopper collar 76. Each of the plurality of grooves 86 is substantially parallel to the central axis of the tubular shaft 26. The plurality of grooves 86 is slidable throughout the inside of the tubular shaft 24 while disposed to the plunger rod 70.

A hollow plunger top 90 has an opening 92. The opening has a diameter 94 substantially conforming to the outer diameter of the cylindrical rod 70, with the opening 92 fittable onto the cylindrical rod 70 as a press fit.

The beach umbrella hole digging device 10 is configured to be inserted into a plot of sand 100. The device is then removed from the sand and the plunger rod 70 is pushed through the tubular shaft 20 to expel the collected sand, forming a hole 102.

What is claimed is:

1. A beach umbrella hole digging device comprising:
a tubular shaft having an exterior, an interior, a central axis, a length, an outer diameter, and an inner diameter;
a plurality of horizontal demarcations disposed on the exterior of the tubular shaft, wherein the plurality of horizontal demarcations is evenly spaced along the length of the tubular shaft;
a tubular T joint having an outer diameter and an inner diameter, wherein the outer diameter of the tubular T joint is greater than the outer diameter of the tubular shaft, and the inner diameter of the tubular T joint substantially conforms to the outer diameter of the tubular shaft, wherein each of the outer diameter of the tubular shaft and the inner diameter of the tubular T joint is configured such that the tubular T joint can receive the tubular shaft as a press fit;
a pair of tubular handles, wherein each of the pair of tubular handles has a capped end, an open end, a thin section, and a thick section, wherein the thick section terminates with the capped end and the thin section terminates with the open end, wherein the thick section of each of the pair of tubular handles has an outer diameter that substantially conforms to the outer diameter of the tubular T joint, and the thin section of each of the pair of tubular handles has an outer diameter that substantially conforms to the inner diameter of the T joint, wherein the outer diameter of each of the thick section and the thin section is configured such that the tubular T joint can receive each of the thin sections of each of the pair of tubular handles as a press fit;
a tubular top extension having a thin side and a thick side, wherein the thick side of the tubular top extension has an outer diameter that substantially conforms to the outer diameter of the tubular T joint, and the thin side of the tubular top extension has an outer diameter that substantially conforms to the inner diameter of the T joint, wherein the outer diameter of each of the thin side and the thick side is configured such that the tubular T joint can receive the thin side of the tubular top extension as a press fit;

a plunger rod having a length and a diameter, wherein the length of the plunger rod is shorter than the length of the tubular shaft, and the diameter of the plunger rod is less than the inner diameter of the tubular shaft;

a tubular plunger stopper collar having an inner diameter, an outer diameter, and a length, wherein the inner diameter of the plunger stopper collar substantially conforms to the diameter of the plunger rod, the outer diameter of the plunger stopper collar substantially conforms to the inner diameter of the tubular shaft, and the length of the plunger stopper collar is less than the length of the tubular shaft, wherein each of the inner diameter and the outer diameter is configured such that the plunger stopper collar can receive the plunger rod as a press fit, and the tubular shaft can receive the plunger stopper collar as a slip fit;

a plurality of grooves disposed on the tubular plunger stopper collar, wherein each of the plurality of grooves is disposed substantially parallel to the central axis of the tubular shaft, wherein the plurality of grooves is slidable throughout the inside of the tubular shaft while disposed to the plunger rod; and a hollow plunger top having an opening, wherein the opening has a diameter substantially conforming to the outer diameter of the cylindrical rod, wherein the opening is fitable onto the cylindrical rod as a press fit.

2. The beach umbrella hole digging device of claim 1 further comprising:

a first cover disposed on the tubular T joint and the pair of tubular handles, wherein the first cover is shaped as a body and arms of an animal; and a second cover disposed on the tubular top extension, wherein the second cover is shaped as a head of an animal.

* * * * *